Apr. 3, 1923.

N. Y. TROIDL.
EDUCATIONAL APPLIANCE.
FILED OCT. 25, 1922.

INVENTOR.
Nellie York Troidl.
by Parker & Bachnow
ATTORNEYS.

Apr. 3, 1923.

N. Y. TROIDL.
EDUCATIONAL APPLIANCE.
FILED OCT. 25, 1922.

INVENTOR.
Nellie York Troidl,
by Parker & Rockwood.
ATTORNEYS.

Patented Apr. 3, 1923.

1,450,395

UNITED STATES PATENT OFFICE.

NELLIE YORK TROIDL, OF NIAGARA FALLS, NEW YORK.

EDUCATIONAL APPLIANCE.

Application filed October 25, 1922. Serial No. 596,865.

*To all whom it may concern:*

Be it known that I, NELLIE Y. TROIDL, a citizen of the United States, residing at Niagara Falls, in the county of Niagara and State of New York, have invented a new and useful Improvement in Educational Appliances, of which the following is a specification.

This invention relates to educational appliances or devices for use in teaching children and is particularly adapted for facilitating the teaching of number work and the like.

The objects of the invention are to provide an educational device whereby the instruction of children in number and other problems is facilitated; also to provide an appliance which is constructed so as to present and assist in instructing different problems, such, for example, as addition and subtraction; and also to provide a device in which the child's instinctive association of like objects is utilized to work out the problems.

The device of this invention comprises a plurality of sets of displaying members, some or all of which are movably mounted on a suitable support, the members of a set preferably being of different appearance one from the other and the members of each set each having an appearance or bearing an indication similar to the appearance of or indication on one or more members of the other set or sets, and another member or group of members, hereinafter termed "master members", which bear a definite relation to the members of like appearance in said sets. In using the invention for the teaching of number work, the members may have suitable numerals or a number of representations of objects displayed upon them and the master members bear numerals or representations of objects which cooperate with the members of like appearances in the sets to complete a problem.

The members are preferably so mounted that they may be readily reversed, whereby different kinds of problems may be displayed and worked out on different faces of the members.

Figure 1:
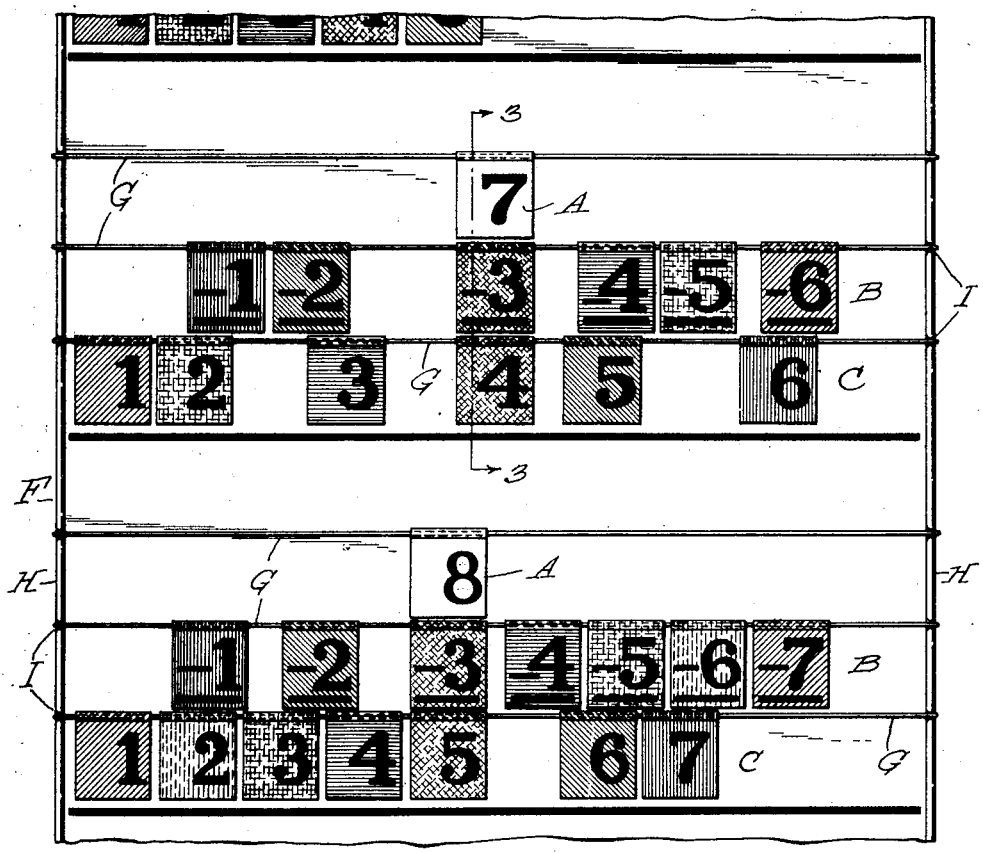
Fig. 1 is an elevation of a device embodying the invention.

In the embodiment of the invention shown, the elements are preferably arranged so as to work toward or from a so-called master member or number. The device may be made of suitable size so as to display problems dealing with any number of master members. For purposes of illustration, the device of Fig. 1 shows two groups dealing with the master numbers 7 and 8. A designates the master members each having a suitable numeral displayed on one face thereof, the numerals 7 and 8 being shown in the device illustrated, and B and C designate two sets of members, the members in a set preferably bearing different numerals one from the other and being of different appearance one from the other but each having an appearance similar to one or more members in the other set. The members of one of the sets may bear signs indicative of the type of problems to be worked and the numerals displayed on the members of the respective sets are such, that when grouped according to the appearance of the members, members of similar appearance cooperate with the master members to portray a problem and answer. For example, as shown in Fig. 1, one side of the device is arranged for work in subtraction and to this end the members B, in addition to displaying different numerals, have the sign of subtraction, or the minus sign, displayed with said numerals. Thus, when the master member A is grouped or alined with a member from the B set and a member from the C set of like appearance, a problem and answer in subtraction is displayed. As illustrated in Fig. 1, the member in group B which displays the numeral 3 with the minus sign is of the same color as the member in the set C which displays the numeral 4 and when these like-colored members are alined with the master member the problem 7—3 with the resultant or answer 4 are displayed together in proper arithmetical order. The other members of the sets are properly colored to give the desired results, for example, the member of set B which displays −1 is of the same color or appearance as the member of set C which displays the numeral 6, whereby association of these like-appearing members together beneath the master member displays the problem and answer 7−1=6 upon the device. For purposes of facilitating the working of problems and the handling of the device, the members are movably mounted on a holder or frame and are adapted to be reversed so that different problems may be worked upon different sides of the members. In the embodiment of the invention shown in Figs. 1 to 4 inclusive, the members comprise cards or blocks of suitable material movably mounted on a frame F. These cards are preferably mounted on suitable guides, such as wires or rods G shown in the drawings, and are preferably free to turn upon the wires or rods G so that the members may be reversed.

Figure 2:
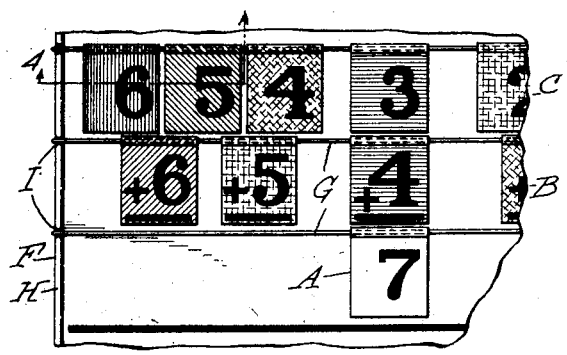
Fig. 2 is an elevation of a portion of the device showing the movable members in reversed positions.
Figure 4:
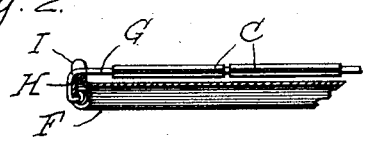
Fig. 4 is a fragmentary section on line 4—4, Fig. 2.
Figure 3:
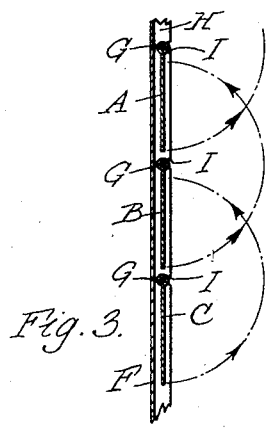
Fig. 3 is a section on line 3—3, Fig. 1.

Fig. 2 shows the members reversed, that is, thrown over on the rods on which they slide and the frame then inverted so that the members hang downwardly from the supporting wires or rods. As illustrated in Fig. 2, the reverse sides of the members may be arranged for problems in addition, the principle of the invention in this regard, including the like coloring of the members in the different sets, so that they may be readily grouped or associated together, being the same as for the faces of the members which display the problems in subtraction.

The frame F may be constructed of suitable sheet material and is preferably provided with side flanges H which stiffen the frame and which may be notched as at I to receive the wires or rods G.

Figure 5:
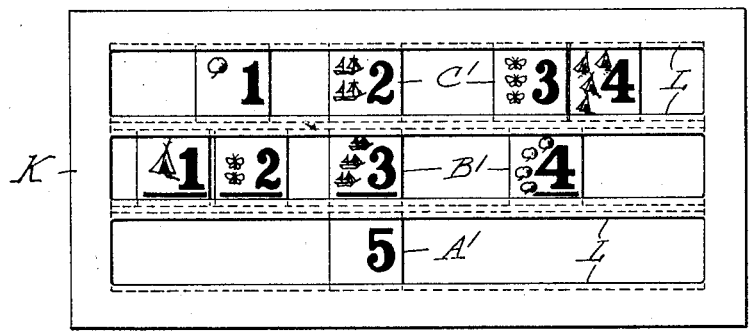
Fig. 5 is a front elevation showing a modified form of mounting for the movable members.
Figure 6:
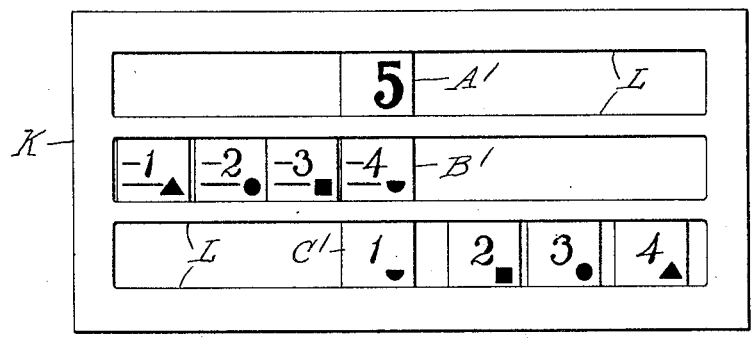
Fig. 6 is a rear elevation of the device shown in Fig. 5.
Figure 7:
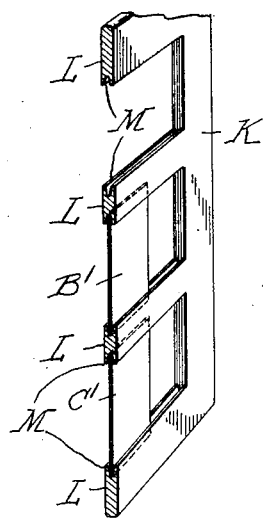
Fig. 7 is a sectional perspective view thereof.

In the modified form of holder or mounting for the movable members illustrated in Figs. 5 to 7, the holder comprises a frame K having guide members L on which the members A′ B′ C′ are mounted. The guide members L are preferably provided with grooves M into which portions of the members are adapted to extend and by means of which they are held in the frame and guided in their sliding movement. As in the case of the device illustrated in Figs. 1 to 4, the members in set B′ each have a similar appearance to one of the members in set C′ so that these members may be readily associated. For example, in Fig. 5, one of the members in set C′ bears the numeral 2 and representations of ships or boats. The member of set B′ bearing the numeral 3 displays representations of like ships or boats, thus presenting to the eye of the child like appearance or indication with the numeral member 2 of set C′, and by grouping these members together, those numbers are provided whose sum is 5, that being the numeral displayed on the master member A′.

As shown in Fig. 5, it is desirable in utilizing representations of objects, for taking advantage of the child's instinctive association of like with like, to display on the members a number of representations with or without corresponding numerals. Thus, for example, the member bearing the numeral 2 has representations of two ships and the member bearing numeral 3 has representations of three ships displayed thereon, and by this means, after associating members of like appearance together to complete the problem, if the child does not recognize or is unable to name the resultant number displayed, he can readily determine the resultant number by counting the number of objects associated together.

The members A′ B′ C′ are provided on their reverse sides with suitable numerals or with representations of different objects or both, and are adapted to work problems of a different kind. For example, as shown in Fig. 6, the reverse side of the device is adapted to present problems in subtraction. In this form, suitable geometric figures or the like are displayed for the purpose of permitting the ready association of members of like appearance with one another, the problems being worked in the manner described for the problems hereinbefore discussed.

The invention utilizes the tendency of a child to instinctively group or associate together objects of like color or appearance or like representations of objects for facilitating a presentation of a lesson and by utilizing striking or appealing colors, or representations of interesting objects or objects with which the child is familiar, the tedium and irksomeness usually attendant with a drilling of children in problems or number work is done away with. The device is simple of construction and interesting to operate and the movable members being securely attached to the support or frame, there is no liability of the members being mislaid or lost.

I claim as my invention:

1. In an educational device, the combination of a support having thereon a plurality of sets of movable members, the members comprising a set bearing numerals differing one from another and presenting different appearances, each member of one set having an appearance similar to the appearance of one of the members of each of the other sets, whereby the members of similar appearance in different sets may be readily grouped together, and a master member bearing a number which when grouped with members of like appearance from the several sets completes a problem.

2. In an educational device, the combination of a support, a plurality of sets of movable members on said support, the members of a set bearing numerals differing one from another and presenting different appearances, each member of one set having an appearance similar to the appearance of one of the members of each of the other sets, whereby the members of similar appearance in different sets may be readily grouped together, and a member bearing a number cooperating with the numerals displayed on the movable members of similar appearance from the several sets when grouped together with said number member to complete a problem.

3. In an educational device, the combination of a plurality of members bearing numerals on opposite faces, guides for movably and reversibly supporting said members, said members being arranged in sets on said guides, the members of a set bearing numerals differing one from another and presenting different appearances, the appearance of each member of a set being similar to the appearance of a member of the other sets, whereby the members of similar appearance in different sets may be grouped together, and a reversible master member bearing numerals on opposite faces which bear a predetermined numerical relation to the numerals on said other members, whereby when said master member is grouped with members of said sets which present similar appearances, a problem and answer in arithmetic is displayed on the members so grouped.

4. In an educational device, the combination of a plurality of sets of members, the members of a set bearing numerals differing one from another and presenting different appearances, each member of one set having an appearance similar to the appearance of one of the members of each of the other sets, a support for said members, means for movably mounting said members on said support, whereby the members of similar appearance in the several sets may be readily grouped together, and a member bearing a number and with which said movable members of similar appearance from the different sets may be grouped to complete a problem in number work.

5. In an educational device, the combination of a plurality of sets of movable members, said members bearing on opposite sides representations of numbers, the members of a set bearing representations of different numbers and presenting different appearances, each member of a set having an appearance similar to the appearance of one of the members of each of the other sets, a support for said members, means for movably mounting said members on said support whereby members of similar appearance from the several sets may be readily grouped together, and a member bearing numbers on opposite sides and with which members of similar appearance from the several sets may be grouped to complete a problem in number work, said members being reversible whereby different problems may be displayed on different sides thereof.

6. In an educational device, the combination of a support, a plurality of guide members on said support, a plurality of number members movably mounted on said guide members, said number members being arranged in sets and each member bearing a numeral, the members of a set bearing different indications one from another, each member of a set having an indication corresponding to the indication on a member of other sets, whereby the members bearing like indications in the different sets may be grouped together, and a master member bearing a number having a predetermined arithmetical relation to said groups of similarly indicated numbers, whereby said movable members and said master member may be associated together and the members will display a problem and answer in number work.

7. In an educational device, a support, a plurality of members mounted to move on guides on said support, and a master member, said first-named members being arranged in sets whereby members of different sets may cooperate with said master member to display different problems and answers, the members of each set bearing representations of portions of problems and answers, the members of a set presenting different appearances one from another, each member of a set having an appearance similar to the appearance of one of the members of another set, whereby members of similar appearance in the different sets may be readily grouped together to cooperate with said master member to display a problem and answer.

NELLIE YORK TROIDL.